Oct. 19, 1948.    W. GROEN ET AL    2,451,548
SWARF MILLING MACHINE
Filed Sept. 21, 1944    4 Sheets-Sheet 1
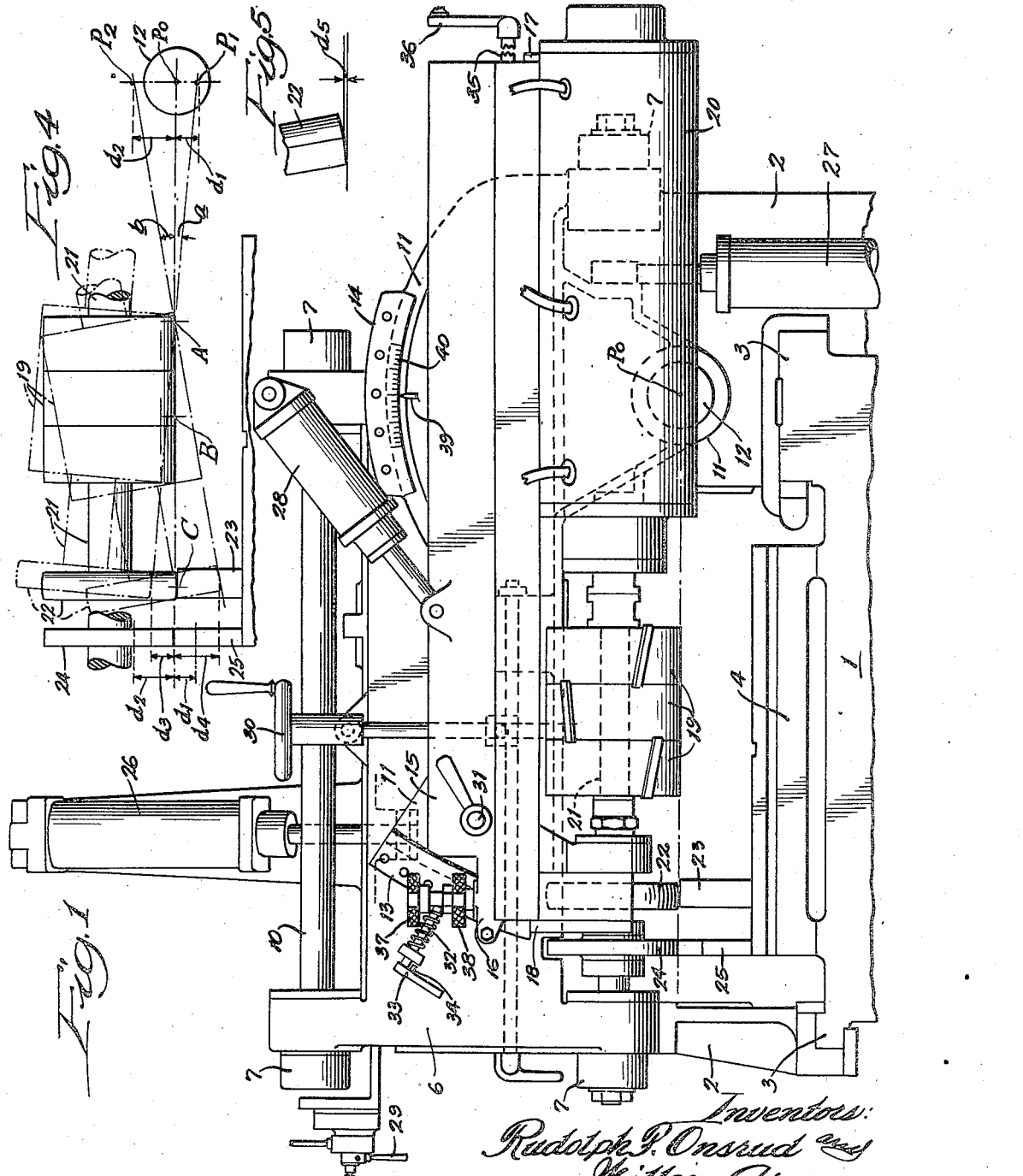

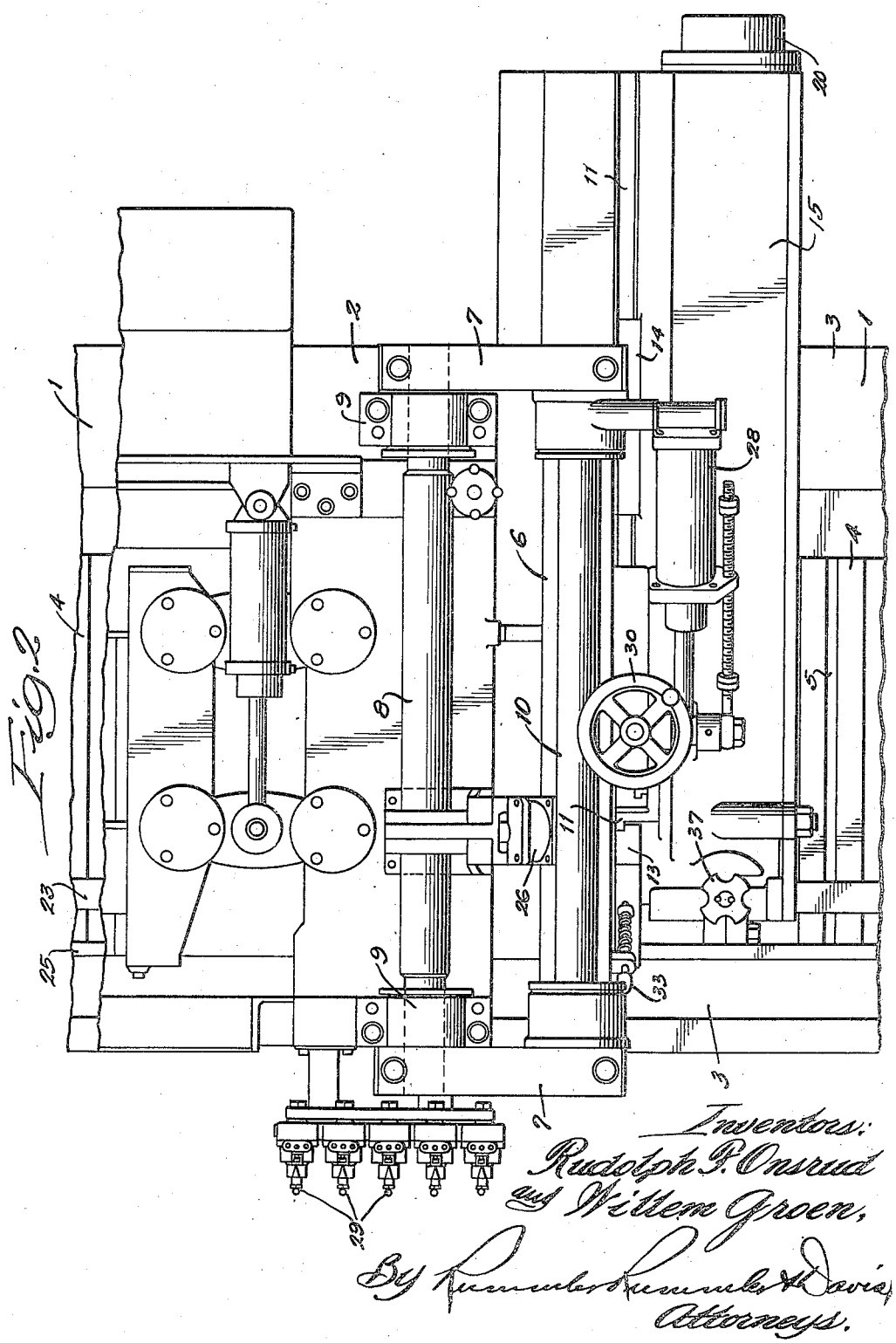

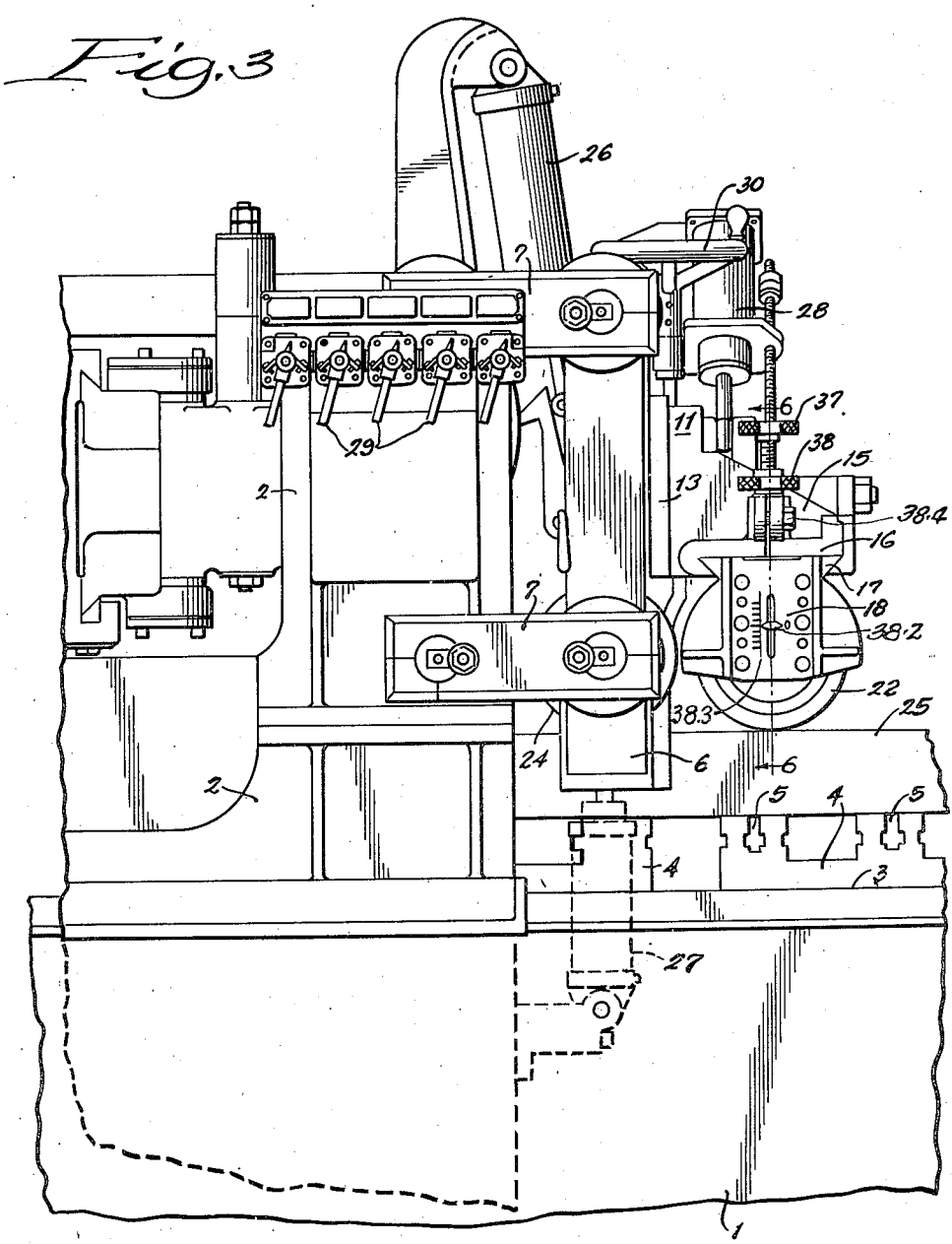

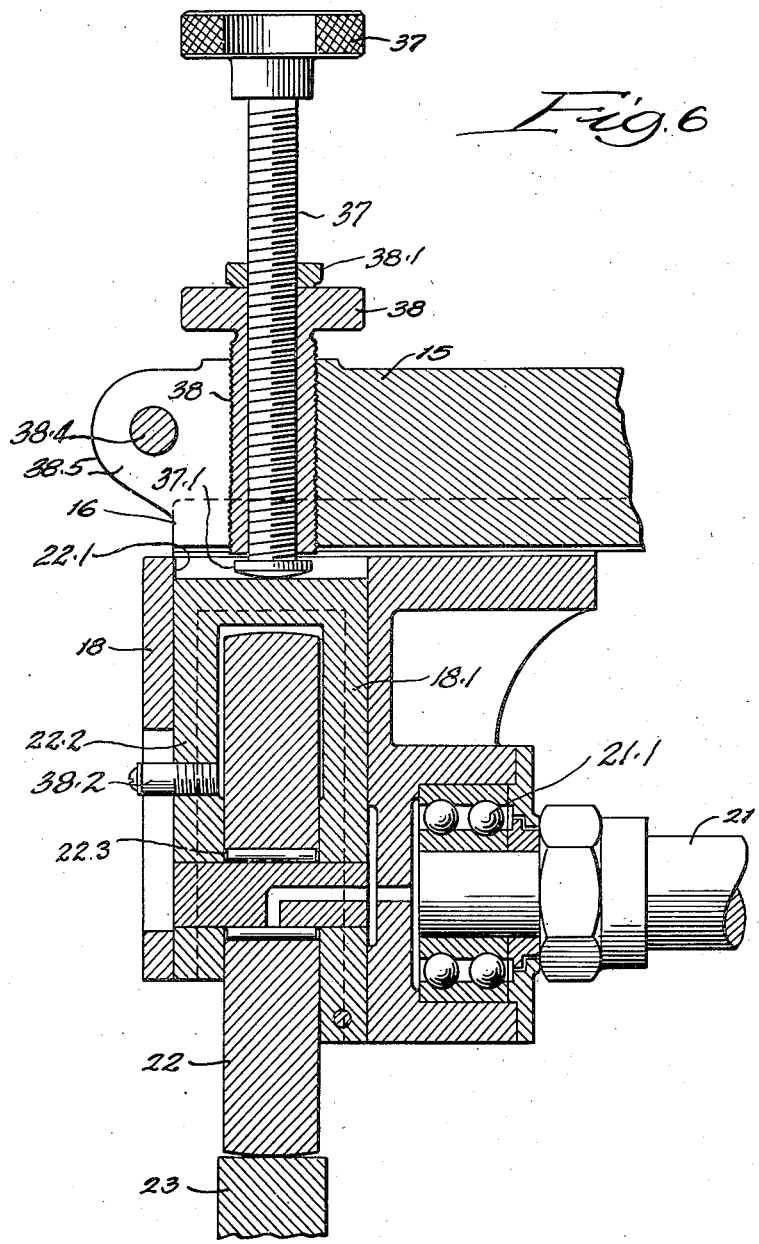

Patented Oct. 19, 1948

2,451,548

UNITED STATES PATENT OFFICE 2,451,548

SWARF MILLING MACHINE

Willem Groen and Rudolph F. Onsrud, Chicago, Ill., assignors to Onsrud Machine Works, Inc., Chicago, Ill., a corporation of Illinois Application September 21, 1944, Serial No. 555,088

8 Claims. (Cl. 90—13)

This invention relates to milling machines for surfacing the faces of long pieces of work, such for example as the main beams of airplane wings to conform them to warped surfaces like those of airfoils.

The specific structure herein shown and described is in the nature of an improvement upon certain features of Patent No. 2,345,494 Spar tapering and shaping machines, issued to Rudolph F. Onsrud March 28, 1944.

The main objects of this invention are to provide improved means for mounting a horizontally journalled cutter; to provide improved means for changing the axial disposition of such cutter both as regards elevation and inclination during its travel along the work-holding bed; and to provide mounting and control means for such devices which shall be sensitive to the influence of the control means but firmly resistant to deviation by resistance of the work to the cutting tool.

A specific embodiment of this invention is illustrated in the accompanying drawings in which:

Figure 1 is an elevation of a swarfing milling machine viewed from the direction of travel of the carriage, with its supporting frame partly broken away and its air and water piping, electric cables and trolley omitted for clearness.

Fig. 2 is a top plan of the same, with the frame bed partly broken away at both ends.

Fig. 3 is an elevation viewed from the left of Figs. 1 and 2.

Fig. 4 is a diagram explanatory of the method of controlling the lifting and tilting movements of the horizontal cutter.

Fig. 5 is an enlarged fragmentary detail of a portion of Fig. 4.

Fig. 6 is an enlarged detail partly in section of the mechanism for adjusting the guide roller which tilts the cutter.

In the form shown in the drawings, the swarfing machine comprises an elongated base 1 which may be of any desired length, being preferably made up of a plurality of fifteen-foot sections mounted end to end on an appropriate foundation.

A carriage 2 is mounted on slideways 3 to travel along the work supporting bed of the base 1. This machine is particularly designed for finishing the longitudinal surfaces of structural beams and spars and the bed is equipped with a multiplicity of transversely disposed work-holding blocks 4 equipped with transverse key slots 5 to receive the attaching bolts by means of which the work is secured, as will be understood.

An elevator block 6 in the form of a heavy plate standing in a vertical plane at the front end of the carriage 2 is carried by two sets of parallel links 7 of equal length whereby the elevator block 6 may move up and down but is always held in a vertical position. The links 7 are carried by trunnion shafts 8 mounted in bearings 9 on the carriage 2 and the outer ends of the corresponding horizontal pairs of these links 7 are connected by trunnion shafts 10 on which the elevator 6 is pivotally hung.

A transversely extending tilting member having a sector portion 11 is mounted on an arbor 12 on the block 6 and is slidably held by arcuate guideways 13 and 14 which, in section, are shaped to radially embrace the end edge of the forwardly extending portion 15 and the circular marginal rim of the sector portion 11, respectively.

The forwardly extending portion 15 of the tilting member is also provided with a horizontal guideway 16, on its under face, for a dovetail slide 17 by means of which the frame 18, which carries the motor and cutting tools, is mounted to slide horizontally across the bed 1 for the purpose of bringing the rotary cutters 19 into transverse registry with a piece of work on the bed.

In the form shown, the motor 20 is integral with this frame 18 and its main shaft 21 is the spindle upon which the cutters 19 are mounted. A spherical roller 22 is journaled adjacent the end of the spindle 21 that is at the left of Figure 1 and this roller cooperates with a template bar 23 for tilting the cutter spindle angularly about the axis of the arbor 12 of the tilting sector. The roller 22 is preferably journaled independently of the cutter spindle 21 so as to be relatively adjustable vertically for accurately controlling the depth of the cut made by the cutter (see Fig. 6). The frame 18 has a depending bearing block 18.1 shaped to support the bearing 21.1 for the end of the spindle 21 and part of this block 18.1 is hollowed to form a housing for the roller 22 and a vertical slideway 22.1 for the forked bearing block 22.2 in which the roller 22 is journaled on roller bearings 22.3. The block 22.2 is yieldably supported in its guideway by tension springs not shown.

A second guide roller 24 (Fig. 1) is journaled on the elevator block 6 and rests on and is guided by a template bar 25 which extends along the bed of the machine and controls the up and down movements of the elevator block while the cutters travel along the work.

Pneumatic jacks 26 and 27 cooperate to control and steady the movements of the elevator block 6. A similar jack 28 controls and steadies the angular movement of the tilting sector 11. These jacks are connected by appropriate piping, not shown, with control valve levers 29 arranged for convenience in a bank at one side of the carriage.

For the purpose of adjusting and holding these moving parts in various positions, the tilting sector is provided with a hand wheel 30 and mechanism operated thereby for tilting it manually, a lever 31 for operating a friction clamp and a spring-pressed latch detent 32 whereby the sector may be locked in a set position by means of the handle 33 which is held in its released position by a stop pin 34.

The motor frame 18 is adjustable along the guideway 16 by means of a threaded shaft 35 operated by a crank 36. During swarf cutting operations, the cutter 19 is controlled by the rollers 22 and 24 and their templates 23 and 25. In order to standardize the problems of designing the templates for swarfing operations, it is desirable to have the lowest point of the tread of roller 22 in the same horizontal plane with the bottom line of the cutter 19 when the parts are in the position of Fig. 1 at which the level cut is made by the cutter. Normally this plane is radial to the axis $P_0$ of the bearing 12 of the tilting frame 18, but as the cutter is reduced in diameter whenever it is sharpened, it is necessary to adjust the roller 22 to correspond. This is accomplished by the concentric set screws 37 and 38 (Fig. 6). The head 37.1 on screw 37 bears on the bearing block 22.2 of roller 22. Set screw 38 is tubular, being internally threaded to fit set screw 37, and is externally threaded to fit a vertical bore in the frame 18. When the head 37.1 is in firm contact with the lower end of set screw 38, this screw is adjusted to bring the low point of roller 22 into line with the bottom of the cutter 19. This adjustment remains fixed for all work that is done in a single operation, but when heavy cuts are made requiring repeated operations of the cutter, the depth of each successive cut is controlled by the set screw 37 which first depresses the roller 22 to raise the cutter to the level of the first rough cut and is then backed off for successive cuts until the head 37.1 contacts with the lower end of set screw 38 for the finishing cut. The lock nut 38.1 may be used to lock the screws 37 and 38 against relative movement.

The indicator pointer 38.2 and scale 38.3 show the operator how far the center of roller 22 is offset from the axis of the cutter spindle. The threaded bore that receives set screw 38 is split longitudinally so that the set screw may be locked in an adjusted position by a bolt 38.4 connecting clamp lugs 38.5.

In the particular form shown, the vertical angular disposition of the axis of the cutter depends upon the turning of the tilting sector 11 about its pivot 12 and is indicated to the operator by the position of the pointer 39 with reference to the scale 40.

The relation of the cutting tool to the movements of the elevator block and tilting sector under the control of the guide rollers and template bars is indicated diagrammatically in Fig. 4. The center of the pivot 12 is indicated in Fig. 4 by the numeral $P_0$. In the machine shown the center of this pivot 12 lies in the horizontal plane that is tangent to the peripheries of the cutter, the elevator guide roller 24 and the spherical guide roller 22 at the lowest points thereof when the motor shaft is horizontal. This plane of reference is indicated by a broken line in Fig. 1 and by the horizontal line through the point $P_0$ in Fig. 4.

In the device shown, the position of the cutter in relation to the work is determined by two factors; a vertical movement of the pivot point $P_0$ due to the rising and falling of the plane roller 24 as it travels along the template bar 25 and the pivotal movement of the motor and its associated mechanism about the pivot point $P_0$ due to the changes in elevation of the spherical roller 22 as determined by the template bar 23.

The cutter can be made to tilt about a selected point between its ends by changing the heights of the template bars 23 and 25, according to certain formulas. Assume, for example, that the vertical center line of the spherical roller is spaced 30 inches from the pivot $P_0$. This distance remains constant.

Now, if we choose a point on the cutter that is midway between the point $P_0$ and the vertical center line of the spherical roller, then in order to keep the point A at constant level while varying the angle of the cut made by the cutter, the elevator template bar 25 has to increase in height as the tilting template bar 23 decreases in height by a like amount in order to keep the cutter edge passing through the point A. If the pivoting of the cutter is about any other point B on the cutter surface, the variation in heights of the two template bars would be in the proportion that the distance of this new point B from the pivot $P_0$ bears to the horizontal distance between point B and point C at the vertical center line of the spherical roller.

This relation is illustrated graphically in Fig. 4, from which it will be seen that to tilt the cutter about point A with the roller 22 moving up through angle $a$, the pivot P is moved down a distance $d_1$ to point $P_1$, while roller 24 is moved upward a distance $d_3$. This result is accomplished by lowering the template surface 25 by an amount equal to distance $d_1$ and by raising the template surface 23 by an amount equal to distance $d_3$. The pivot P and the roller 24 go up and down along straight vertical paths, while the roller 22 moves up or down on a slightly curved vertical path when tilted, due to its fixed spacing from the pivot P. In a mathematical formula for calculating distance $d_3$, the tilting of roller 22 requires that allowance be made for a displacement shown as distance $d_5$ in Fig. 5 which equals one-half of the diameter of roller 22 times one minus the cosine $a$ of angle of tilt.

To illustrate, let it be assumed that the center line of the spherical roller is 30 inches from the pivot $P_0$. This distance ($P_0$ to C) remains constant. For a zero (0) degree angle this pivot is level with the lower edges of the plain roller, spherical roller and the cutter. Choosing a reference point A at 30 inches divided by 2 or 15 inches from $P_0$ and desiring to have the tilt about this reference point A at a variable angle with the cutter end of the motor shaft going down, as the carriage travels forward, then the outer template bar 25 has to increase in height and the inner template bar 23 has to decrease in height by a like amount to keep the cutter edge going through point A. To tilt the cutter about another point B which lies at ⅔×30 or 20 inches from $P_0$ and 10 inches from C, the outer bar 25 must increase in height approximately two times as fast as the height of the inner bar 23 decreases. To make a cut of variable angle with the cutter end of the motor going up, then the outer bar height decreases, and the inner bar height increases in ratios corresponding to the ratio established by the location of the reference point A or B as the center about which the angle of the cut is to be varied.

The shaping of the templates at any position of the carriage can be calculated according to the following formulas, where Distance $P_0$ to C=30 inches,
Distance $P_0$ to A=15 inches and
Distance $P_0$ to B=20 inches.
Diameter of roller 22=8 inches.

*Example I.—Cutter end of motor shaft going up*

Point A in cutter edge to remain at same location:
Then, $d_1 = 15 \times$ tangent of angle $a$
$d_3 = 30 \times$ sine of angle $a - 4$ (1—cosine of $a$) — $15 \times$ tangent of angle $a$.

Point B in cutter edge to remain at same location:

$d_1 = 20 \times$ tangent of angle $a$
$d_3 = 30 \times$ sine of angle $a - 4$ (1—cosine of $a$) — $20 \times$ tangent of angle $a$.

*Example II.—Cutter end of motor shaft going down*

Point A in cutter edge to remain at same location:

$d_2 = 15 \times$ tangent of angle $b$
$d_4 = 30 \times$ sine of $b + 4$ (1—cosine of $b$) — $15 \times$ tangent of $b$.

It will be understood that if a point such as A or B on the cutter remains in the same location, then the travel of the carriage will cause that point of the cutter to travel in a straight level line. To cut a constant angle, the motor shaft can be set and locked at that angle manually and then either template will control changes in the height of the cut.

Although but one specific embodiment of this invention is herein shown and described, it will be understood that numerous details of the structure shown may be altered or omitted without departing from the spirit of the invention as defined by the following claims:

We claim:

1. In a milling machine, a work supporting elongated bed and a cutting tool mounting overlaying said bed for relative travel lengthwise of the bed; said tool mounting comprising a vertically movable elevator member, a tilting member extending transversely across said bed and turnable on said elevator member about a horizontal axis directed along said bed, and located adjacent one side of said bed and a motor-driven tool spindle journaled on said tilting member crosswise of said bed; a cutting tool on said spindle and spaced from said axis; a pair of guide rollers located respectively on said elevator member and on said tilting member; and a pair of template bars extending along said bed and respectively co-acting with said guide rollers to control respectively the elevation and tilting of said tool spindle with respect to said bed, said tilting member roller being adjustable vertically relative to the axis of said spindle.

2. In a milling machine, a work supporting elongated bed and a cutting tool mounting overlaying said bed for relative travel lengthwise of the bed; said tool mounting comprising a vertically movable elevator member, a tilting member extending transversely across said bed and turnable on said elevator member about a horizontal axis directed along said bed and located at one side of said bed; a slide member movable across the bed on said tilting member; a motor-driven tool spindle journaled on said slide member crosswise of said bed; a cutting tool on said spindle and spaced from said axis; a pair of guide rollers located respectively on said elevator member adjacent the transversely extending end thereof and on said tilting member; and a pair of template bars extending along said bed and respectively coacting with said guide rollers to control respectively the elevation and tilting of said tool spindle with respect to said bed.

3. In a milling machine, a work supporting elongated bed and a cutting tool mounting overlaying said bed for relative travel lengthwise of the bed; said tool mounting comprising an upright frame, an elevator member, a set of equal parallel links each having its opposite ends pivoted on said frame and elevator member respectively for vertical parallel motion control of said elevator member; a tilting member turnable on said elevator member about a horizontal axis directed along said bed and located at one side of said bed; a motor-driven tool spindle journaled on said tilting member crosswise of said bed; a cutting tool on said spindle and spaced from said axis; a pair of guide rollers located respectively on said elevator member and said tilting member; and a pair of template bars extending along said bed and respectively coacting with said guide rollers to control respectively the elevation of said elevator member and the tilting of said tool spindle with respect to said bed.

4. In a milling machine, an elongated work bed, a carriage mounted above for lengthwise travel along said bed, a cutter spindle having its axis of rotation in a vertical plane transverse to the path of said carriage, a cutter on said spindle, a bearing supporting said spindle for tilting it about an axis extending along the path of travel of said carriage at one side of said cutter, means comprising horizontally directed parallel motion links having their opposite ends pivoted respectively to said bearing and carriage for vertical bodily movement of said spindle, and template means controlling the relative tilting and bodily movements of said spindle during the travel of said carriage along said bed.

5. In a milling machine, an elongated work bed, a carriage mounted above for lengthwise travel along said bed, a cutter spindle having its axis of rotation in a vertical plane transverse to the path of said carriage, a cutter on said spindle, a bearing supporting said spindle for tilting it about an axis extending along the path of travel of said carriage at one side of said cutter, means comprising horizontally directed parallel motion links having their opposite ends pivoted respectively to said bearing and carriage for vertical bodily movement of said spindle, and template means controlling the relative tilting and bodily movements of said spindle during the travel of said carriage along said bed, said template means comprising a spherical roller journaled concentrically with said spindle and a track surface therefor on said bed.

6. In a milling machine, an elongated work bed, a carriage mounted above for lengthwise travel along said bed, a cutter spindle having its axis of rotation in a vertical plane transverse to the path of said carriage, a cutter on said spindle, a bearing supporting said spindle for tilting it about an axis extending along the path of travel of said carriage at one side of said cutter, means comprising horizontally directed parallel motion links having their opposite ends pivoted respectively to said bearing and carriage for vertical bodily movement of said spindle, and template means controlling the relative tilting and bodily movements of said spindle during the travel of said carriage along said bed, said template means comprising a spherical roller journaled concentrically with said spindle, a second roller coacting with said parallel motion linkage to support said bearing, and individual track surfaces on said bed coacting with said rollers respectively.

7. In a milling machine, an elongated horizontal work bed, a carriage mounted above for lengthwise travel along said bed, an elevator plate disposed in a vertical plane in front of said carriage and transverse to said bed, links connecting said elevator plate to said carriage for parallel vertical motion of said elevator plate, a tilting member mounted for rotation on said elevator plate about an axis disposed lengthwise of the bed adjacent one side thereof, a slideway on said tilting member extending crosswise of said bed, a cutter spindle bearing frame carried by said slideway, a cutter spindle journaled in said spindle bearing member on an axis extending crosswise of said bed, a roller positioned to support said elevator plate, a roller on said cutter spindle frame adjacent the side of said bed opposite to the axis of said tilting member and controlling the angular position of said tilting member, a cutter on said spindle between said last-named roller and the axis of said tilting member, and individual template tracks along said bed respectively coacting with said rollers to control the elevation and tilting of said cutter spindle.

8. In a milling machine, a work supporting elongated bed and a cutting tool mounting overlaying said bed for relative travel lengthwise of the bed; said tool mounting comprising a vertically movable elevator member, a tilting member turnable on said elevator member about a horizontal axis directed along said bed, a motor-driven tool spindle journaled on said tilting member crosswise of said bed; a pair of guide rollers located respectively on said elevator member and said tilting member; a pair of template bars extending along said bed and respectively coacting with said guide rollers to control respectively the elevation and tilting of said tool spindle with respect to said bed, a bearing block on said tilting member for carrying the respective guide roller and being vertically shiftable relative to the cutter spindle, adjustable stop means on said tilting member coacting with said bearing block, said stop means comprising a tubular set screw for regulating the normal cutting position of said spindle, and a second set screw extending longitudinally through said tubular set screw to adjust said roller bearing block for preliminary rough cuts by the tool without disturbing the adjustment of said tubular set screw.

WILLEM GROEN.
RUDOLPH F. ONSRUD.

REFERENCES CITED

The following references are of record in the file of this patent:

UNITED STATES PATENTS

| Number | Name | Date |
| --- | --- | --- |
| 1,691,898 | Kosfeld | Nov. 13, 1928 |
| 1,985,753 | Weiss | Dec. 25, 1934 |
| 2,006,121 | Tham | June 25, 1935 |
| 2,026,042 | Howe | Dec. 31, 1935 |
| 2,335,625 | Wilson | Nov. 30, 1943 |
| 2,341,194 | Schwartz | Feb. 8, 1944 |
| 2,356,571 | Dewoitine | Aug. 22, 1944 |